United States Patent
Wilfert

[11] 3,881,736
[45] May 6, 1975

[54] EQUALIZATION INSTALLATION FOR THE CHASSIS OF MOTOR VEHICLES

[75] Inventor: Karl Wilfert, Gerlingen-Waldstadt, Germany

[73] Assignee: Daimler-Benz Aktiengesellschaft

[22] Filed: June 5, 1973

[21] Appl. No.: 367,191

Related U.S. Application Data

[63] Continuation-in-part of Ser. No. 98,240, Dec. 15, 1970, abandoned.

[30] Foreign Application Priority Data

Feb. 28, 1970  Germany............................ 2009489
May 2, 1970  Germany............................ 2021474

[52] U.S. Cl.................................. 280/6.1; 280/104
[51] Int. Cl............................................. B60g 21/08
[58] Field of Search............ 280/6, 6.1, 6 H, 124 F, 280/124 LR, 104

[56] References Cited

UNITED STATES PATENTS 3,124,368  3/1964  Corley .................................... 280/6
3,539,030  11/1970  Gerin.................................... 280/6.1

Primary Examiner—Philip Goodman
Attorney, Agent, or Firm—Craig & Antonelli

[57] ABSTRACT

An equalization installation for the chassis of motor vehicles, particularly of passenger motor vehicles, with an electronic analog and/or digital computer producing control pulses for servo-control devices arranged at the vehicle; the computer includes devices for detecting movements and/or force changes of the chassis and/or of the body and effects compensations therefor.

10 Claims, 3 Drawing Figures

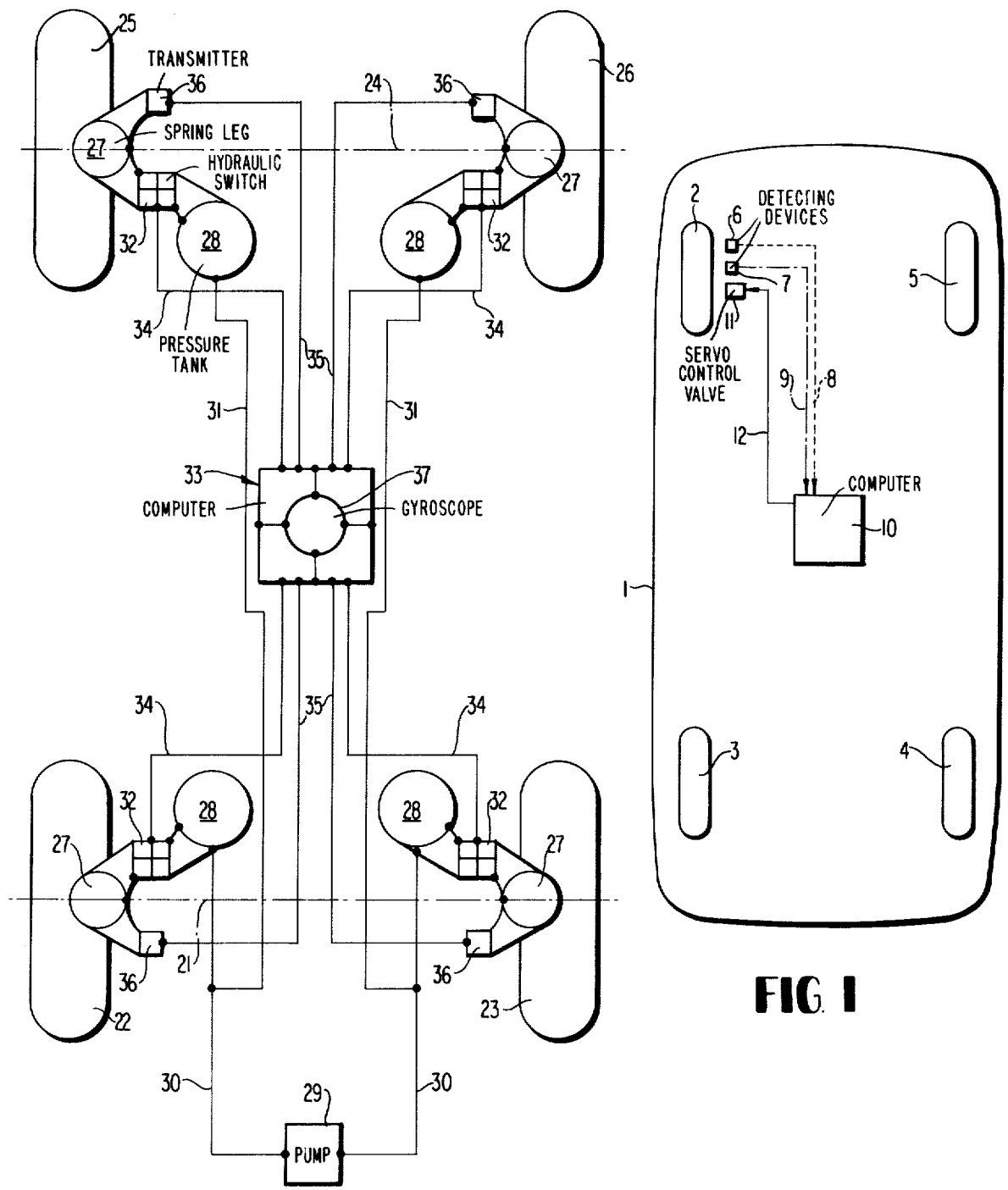

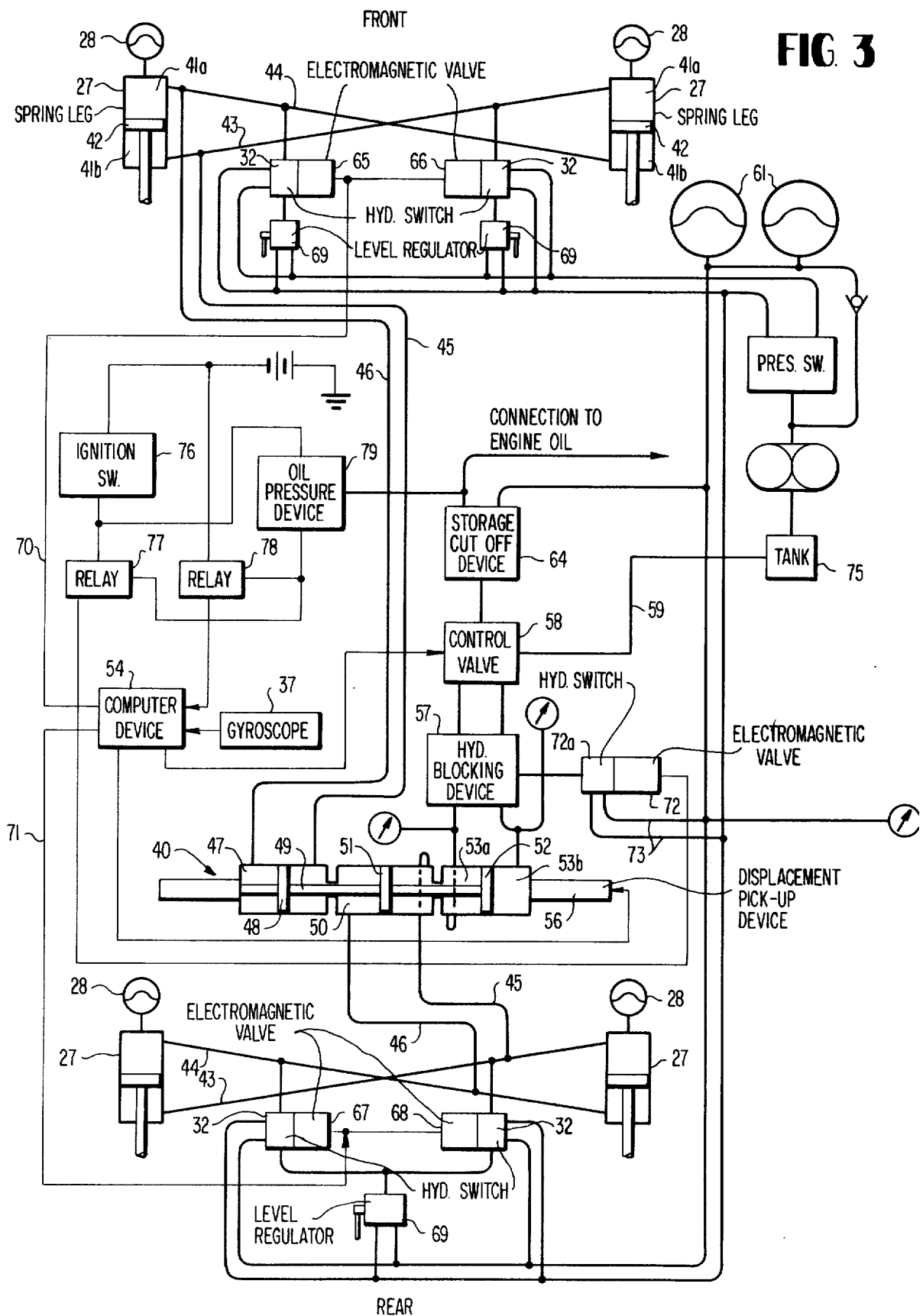

EQUALIZATION INSTALLATION FOR THE CHASSIS OF MOTOR VEHICLES

This is a continuation-in-part of my copending application Ser. No. 98,240, filed Dec. 15, 1970, now abandoned.

The present invention relates to an equalization installation for the chassis of motor vehicles, especially of passenger motor vehicles.

The driving stability of a vehicle is influenced by the chassis or wheel frame parts such as steering, axles, tires, spring system, and damping. Many components, for example, side wind or street surface, or street guidance act on this chassis or wheel frame with different and in part very rapidly varying magnitudes. The side wind, for example, seeks to rotate the vehicle out of its driving direction and to push the same beyond the roadway. In order to eliminate this influence, counter-reactions are necessary. Frequently, however, the action caused by this influence proceeds so rapidly that the driver cannot carry out sufficiently rapidly the correct counter-reaction.

Relative movements occurring between the wheels and the body change the axle- and steering-geometry which also require counter-reactions. The vehicle carries out uncontrollable track changes on uneven roads or in case of a tilting of the body conditioned by a steering deflection. Since the sequence in course of time is very fast in that case, counter-measures of the drive frequently arrive too late.

Mechanical, hydraulic, pneumatic, and electrical equalization installations or servo-systems are known in a very large number which, for example, exercise an influence on the wheel track change, on the camber change, on the king-pin angle or steering knuckle change and on the toe-in change, on the longitudinal tilting, on the vibration-damping, etc. However, of these prior art equalization installations or servo-systems, only a small fraction could be realized in practice since their function is limited by the inherent inertia and by the large number of the influences to be taken into consideration, and since the latter cannot be controlled by mechanical, hydraulic, pneumatic, and electric means.

The present invention is concerned with the task to provide an equalization installation for a chassis which represents a system with several degrees of freedom, in which the individual structural parts possess partially a linear and partially a non-linear function, which equalization installation accurately detects all influences and above all initiates in the shortest possible time the necessary counter-reactions.

The present invention essentially consists in that one or several analog and/or digital electronic controllers or computers of conventional construction are provided for transmission of signals to servo-control devices arranged at the chassis and/or body, which include means for detecting movements and/or force changes of the chassis and/or of the body and effect the compensation therefor.

An electronic auto-stabilization is produced thereby which detect in a fraction of a second all movements and/or force-changes and which transmits electric signals on the basis thereof in the shortest period of time by analog and/or digital computation which compensate disturbance components with the aid of the servo-control devices. The servo-control systems may thereby be of hydraulic, pneumatic, or electric type of any known construction.

It is advantageous if, for all control operations, a central computer is provided. By such an arrangement, more simple control operations can be included into the electronic auto-stabilization, such as, for example, level compensation, compensation for acceleration nose-diving, an installation which erects the body in the curve against the centrifugal force, etc.

For reasons of simplification, however, it may be appropriate to provide separate electronic control circuits for relatively simple control operations dependent essentially on one componenet, such as the compensation or equalization of the acceleration nose-diving or of the erecting of the body opposite the centrifugal force or the like, which separate electronic control circuits have a controller or computer each. For example, also the so-called "shaking" of motor vehicles can be avoided by a corresponding influence of the spring stroke movements of the wheels.

According to a further feature of the present invention, an acceleration pick-up device or gyroscope may be arranged in or at the vehicle for the generation of control signals as a function of the position of the vehicle body. The control signals, for example, for the position of the motor vehicle body, can also be realized with the aid of a gyroscope.

Another aim of the present invention resides in so constructing an equalization installation of the aforementioned type that both a torsion equalization or twist compensation of the vehicle body as well as a level control are attainable in the shortest possible time. Accordingly, the present invention further essentially consists in that a hydraulic switch which is arranged between the spring legs and the pressure tanks of a conventional hydropneumatic spring system, is adapted to be actuated electrically by the analog computer which is connected with signal tramsmitters preferably connected with the spring legs. It becomes possible thereby to utilize the known wheel spring elements by electronic computation of transmitted pulses for the purpose to undertake counter-reactions in the shortest time which compensate both a twisting of the vehicle body as also control the level.

In an advantageous type of construction according to the present invention, a common analog controller or computer secured at the body or frame may be provided for all wheels, which is connected with signal transmitters and additionally includes a gyroscope. Thus, not only information concerning the movements and force changes at the wheels and axles but also information concerning changes in the position of the body of the vehicle are fed to the analog computer, which the computer uses for the control of the automatic equalization installation.

In another advantageous type of construction according to the present invention, a common controller or computer of the analog or digital type secured at the body or frame is provided for all wheels and receives signals concerning the movemtns, force changes and position of the body of the vehicle from a gyroscope or acceleration pick-up device. In response to the received signals the computer provides output signals for controlling a servo-control device for providing automatic equalization of the vehicle wheels or provides signals for controlling hydraulic switches at the vehicle wheels so as to provide automatic equalization in this manner.

Accordingly, it is an object of the present invention to provide an equalization installation for the chassis of motor vehicles which avoids by simple means the aforementioned shortcomings and drawbacks encountered in the prior art.

Another object of the present invention resides in an equalization installation of the type described above which not only is capable of producing counter-reactions in the shortest possible time, but is also able to take into consideration many variables influencing these driving conditions.

A further object of the present invention resides in an equalization installation for motor vehicles which is simple in construction yet effective to provide an automatic equalization that satisfies all prerequisites even when driving the vehicle at high speeds.

These and further objects, features, and advantages of the present invention will become more obvious from the following description when taken in connection with the accompanying drawing which shows, for purposes of illustration only, two embodiments in accordance with the present invention, and wherein:

FIG. 1 is a schematic plan view of a vehicle provided with an equalization installation according to the present invention;

FIG. 2 is a schematic plan view of a modified embodiment of an equalization installation according to the present invention; and FIG. 3 is a schematic view of another modified embodiment of an equalization installation according to the present invention.

Referring now to the drawing, and more particularly to FIG. 1, representing a top plan view on a schematically illustrated passenger motor vehicle 1, this vehicle includes in the customary manner four wheels 2, 3, 4, and 5. A displacement or motion pick-up device 6 and a force pick-up device 7 of any conventional construction are arranged within the area of the wheels 2, 3, 4, and 5 at the chassis and/or at the vehicle body or frame of the passenger motor vehicle 1, which are connected by way of lines 8 and 9 with an analog or digital type of electronic controller or computer 10 arranged in the center and of known conventional construction. A control valve 11 of a hydraulic, pneumatic, or electric servo-control system of any conventional type is also arranged within the area of the wheel 2 which is connected by way of a line 12 with the computer 10. In a similar manner, motion pick-up devices, force pick-up devices and control valves are also provided for the other wheels 3, 4, and 5 in a manner not shown in detail herein, which are analogously connected to the central computer 10. The central electronic computer 10 for all control operations is fed with measuring data of the displacement pick-up or detecting devices 6 and of the force pick-up or detecting devices 7 and transmits in a short period of time corresponding electric signals such as pulses to the control valve 11 of the servo-control system which compensate the disturbance components.

More simple control operations, such as, for example, level equalization, compensation for starting nose-diving, an installation which erects the vehicle in a curve against the centrifugal force, or the like, are included in the thus-produced electronic automatic stabilization system in a conventional manner. Twisting stresses at the vehicle are avoided by the electronic autostabilization according to the present invention in that in case of a spring stroke movement of the one wheel 2, determined by a motion pick-up device 6 or a force pick-up device 7, the two adjacent wheels 3 and 5 are caused by the computer 10 and the servo-control system to carry out an oppositely directed movement whereas in a similar manner, the diagonally opposite wheel 4 is caused to carry out a stroke movement in the same direction. As a result thereof, the "shaking" of motor vehicles can be avoided which involves torsional vibrations of the vehicle body about its longitudinal axis occurring with the customary wheel suspensions, which occur, for the most part, with a frequency of 12 to 18 Hz. The more simple control operations may also be effected by separate electronic control circuit devices each having its own computer or controller which may be considered to be illustrated by the FIG. 1 arrangement wherein each wheel is coordinated with such a control circuit device in addition to having a central controller or computer.

The electronic auto-stabilization is also operative if the vehicle moves along any possible road curve deviating from a circle. The centripetal acceleration is thereby no longer constant whereas additionally, further accelerations occur about the roll axis and the vertical axis. All of these influences are thereby detected rapidly, i.e., electronically, and the servocontrol mechanisms carry out corresponding counter-reactions or compensation functions within the shortest possible time.

The electronic auto-stabilization additionally effects a separate control of the wheel movement. A sufficiently rapidly operating wheel correction is possible by the electronically actuated servo-control system which assures, for example, an exact parallel guidance of the wheels 2, 3, 4, and 5.

FIG. 2 illustrates in top plan view a schematically shown vehicle with a front axle 21 having the wheels 22 and 23 and a rear axle 24 with the wheels 25 and 26. The wheels 22 and 23 of the front axle 21 and the wheels 25 and 26 of the rear axle 24 are each provided with hydropneumatic spring means which consist each of spring legs 27 arranged at the wheels 22, 23, 25, and 26, and associated pressure tanks 28. The pressure tanks 28 are fed with pressure oil by a pump 29 by way of hydraulic lines 30 and 31. One conventional hydraulic switch 32 each is arranged between the pressure tanks 28 and the spring legs 27 which is able to connect the pressure tank 28 with the respective associated spring leg 27 both in the feed as also in the discharge direction.

The actuation of the hydraulic switch 32 takes place electrically, and more particularly, from a common central analog computer generally designated by reference numeral 33, with which each hydraulic switch 32 is connected by way of a respective electric line 34. The electronic analog computer 33 is additionally connected by way of electronic lines 35 with pulse transmitters 36, which are coordinated to each spring leg 27 of the wheels 22, 23, 25 and 26. Pulse transmitters 36 may be so arranged and constructed in any conventional manner that they respond to movements of the spring legs 27 or to pressure changes in the spring legs 27 and transmit pulses to the analog computer 33. The analog computer 33 processes the pulses transmitted by the pulse transmitters 36 and fed thereto by way of the electric lines 35 and controls by way of the electric lines 34 the hydraulic switches 32 in response thereto. A level control is achieved by the control of the pressures in the spring legs 27 of the wheels of an axle, for example, of the wheels 22 and 23 of the front axle 21, or of the wheels of a vehicle side, for example, of the wheels 23 and 26. Simultaneously therewith, a twist or torsion equalization is brought about additionally by the control of the pressure in the spring legs 27, for example, of the wheels 23 and 25.

In order to supply the analog computer 33, securely arranged at the body of the passenger motor vehicle, additionally with information concerning the position of the vehicle body and therewith to influence additionally the control of the spring legs 27, a gyroscope device or acceleration pick-up device is included or mounted in the analog computer 33. It becomes possible thereby to detect also the movements of the vehicle body and to evaluate the same by means of the analog computer 33 in the equalization of the disturbance components.

FIG. 3 is a schematic view of another modified embodiment of an equalization installation which is somewhat similar to the arrangement illustrated in FIG. 2. As such, like reference numerals are utilized to designate like parts in the FIG. 3 and FIG. 2 embodiments.

As shown in FIG. 3, the wheels of the vehicle (not shown) are provided with spring legs 27 connected in the conventional manner with respectively one pressure tank or reservoir 28, the spring legs 27 being connected hydraulically in a cross-wise manner so that each upper pressure space 41a above the spring leg piston 42 of each spring leg is adjoined respectively to the pressure space 41b below the piston 42 at the respective front and rear axles. The connection between the spring legs of the respective front and rear axles is obtained by conduits 43 and 44 each of which is in communication via a connection line 45 and 46, respectively with a pressure chamber of a pressure equalizing servo device 40. As shown, the front spring legs are connected via the connection lines 45 and 46 with a pressure chamber 47 of the servo device 40, the pressure chamber 47 having a piston 48 disposed therein and displaceable via a piston rod 49. In the same manner, the spring legs at the rear axle are in communication via the connection lines 45 and 46 with a pressure chamber 50 of the pressure equalizing servo device 40, the pressure chamber 50 having a displaceable piston 51 disposed therein and displaceable by the piston rod 49. The pistons 48 and 51 are joined by the connecting rod 49 to an adjusting servopiston 52 arranged within a pressure chamber 53 of the device 40. The position of the servopiston 52 within the pressure chamber 53 is dependent on the pressure oil feed in the chamber 53 and this feed is controlled by the controller or computer 54 in the manner as described hereinafter. The computer or controller 54 which may be of an analog or digital type is connected to provide an electrical output in response to an input from the gyroscope or acceleration pick-up device 37. In response to an input from the device 37, the computer in accordance with the type of equalization desired may provide an output to a displacement pick-up device 56 via the electrical connection line 55. The displacement pick-up device 56 is responsive to the signal from the computer 54 to free the oil feed to one or the other of the partial chambers 53a and 53b of the operating pressure chamber 53 and thus shift the piston 52 either to the left or to the right by a certain amount. The pick-up device 56 may operate in accordance with the number of pulses or duration of a pulse supplied by the computer 54 for shifting the servopiston by the desired amount. The pressure chamber 53 as shown, is in communication via a hydraulic blocking device 57 and a control check valve 58 with the oil tank 75 via the return flow conduit 59 and in communication via the line 60 with the hydraulic pressure reservoirs 61 which are supplied respectively by way of a pump 62 from the tank 75. The check valve 58, in turn, is controlled by the computer 54 via an electric line 63.

The hydraulic blocking device 57 serves for shutting off the position-equalizing servo device 40 so that the automotive vehicle can also be driven without the operation of the device 40. For this purpose, the blocking device 57 closes the two feed lines to the pressure chamber 53 so that the piston 52 remains in the central position. By way of the control check valve 58, the amount and the pressure of the pressure oil required in the adjustment device can be controlled. It is also possible to block the feed line from the hydraulic pressure reservoirs 61 by means of the storage blocking device 64 so that the system can then be charged by the engine oil in the manner illustrated. There is also provided hydraulic switches 32 of conventional construction which are controlled by electromagnetic valves 65, 66, 67, and 68 associated with respective ones of the connection lines for the spring legs of the front and rear axles. The hydraulic switches are connected on one hand directly to the pressure oil supply in communication with the hydraulic pressure reservoirs 61, and, on the other hand, are also connected respectively to this pressure supply system via level regulators 69. The level regulators are of conventional construction and as shown, a single regulator is associated with each of the hydraulic switches of the front axle while a single level regulator is associated with both of the hydraulic switches of the rear axle. Additionally, the electromagnetic valves 65 and 66 for controlling the hydraulic switches at the front axle are connected to the computer 54 via electric line 70 and the valves 67 and 68 for the rear axle are connected to the computer 54 via electric line 71.

For operation of the present invention, the switching on of the ignition switch 76 serves for energizing relays 77 and 78 so that the computer 54 is supplied with power and simultaneously, the electromagnet 72 is energized. Additionally, an engine oil pressure device 79 is also energized. The electromagnet 72 releases, via conduit 73, the feed of pressure oil to an auxiliary hydraulic switch 72a controlled thereby which then triggers the hydraulic blocking device 57 which must expend relatively large forces. At this moment, the position-equalizing device 40 is ready for operation. Additionally, via the conventional level regulator devices 69, the total level of the vehicle, which is, for example, impaired by too great a load, is regulated in the conventional manner to raise or lower the spring legs of the vehicle. Such manual level control regulators can, however, be in effect, short-circuited as soon as the computer 54 responds. The response of the computer 54 is effected when a control signal or pulse is fed thereto by the gyroscope or acceleration pick-up device 37 indicating that the vehicle is either inclined too much toward the right or left side about the longitudinal axis of the vehicle, or has an inclination deviating from the average road position about a transverse axis which inclination is too great toward the front or toward the rear. These control signals can be produced, for example, by detecting the deviation of the gyrocompass needle from a predetermined zero point on a system of coordinates of the gyroscope and by triggering counter-reactions by the computer 54 in dependence on the deviation, depending upon whether the control point is in one of the four quadrants formed by the coordinate system. For example, when it is detected that the vehicle has tilted toward the left about the longitudinal axis, an electromagnetic valve of the displacement pick-up device 56 is energized by the computer via electrical line 55, which valve effects a shifting of the servopiston 52 toward the left and thus also a shifting of the pistons 48 and 51 toward the left. In this manner, the pressures in the lines 46 connected to the lines 44 of the front and rear axle spring legs 27 are increased such that both of the left spring legs are retracted. Consequently, there is an equalization of the position about the longitudinal axis of the vehicle. If it is additionally detected that the vehicle has tilted too much toward the front, the computer provides an output signal via the line 70 for energizing the electromagnetic valves 65 and 66 controlling the hydraulic switches 32 of the front spring legs so that both spring legs of the front axle react as during the regulation of the level regulator 69.

Thus, the present invention provides an equalization installation capable of detecting rapidly and accurately the relative movements between wheels and the body which change the axle and steering geometry and require counter-reactions and which automatically initiate in the shortest possible time the necessary counter-reactions. It is noted that with regard to the FIG. 3 embodiment, the computer or controller 54 may be constructed of conventional analog or digital type circuits as is known by one of ordinary skill in the art to provide the output signals in response to the input signals in the manner indicated. It is also possible to provide the computer 54 with inputs from the pick-up devices 6 or 7 as in FIG. 1 or the pulse transmitter 36 in the FIG. 2 embodiment. In this manner, the computer may be made responsive to the conditions sensed at the individual wheels of the vehicle in addition to the conditions sensed by the gyroscope or acceleration pick-up device 37.

While I have shown and described several embodiments in accordance with the present invention, it is understood that the same is not limited thereto but is susceptible of numerous changes and modifications as known to those skilled in the art, and I therefore do not wish to be limited to the details shown and described herein, but intend to cover all such changes and modifications as are encompassed by the scope of the appended claims.

What is claimed is:

1. Equalization installation for the chassis of motor vehicles, comprising electronic computer means operatively connected with servo-control means arranged at least at one of the two parts consisting of chassis and body of the vehicle, said servo-control means being controlled by signals transmitted from the computer means, and detecting means forming transmitter means for detecting at least one of the movements and force changes of at least one of the two parts consisting of chassis and body, said detecting means being operatively connected with said computer means for feeding the signals detected by said detecting means to said computer means, said computer means being responsive to the signals of said detecting means for processing the signals and for transmitting output signals to the servo-control means to effect an equalization of the chassis, said detecting means including accelereation responsive means for detecting and feeding signals indicative of the positioning of one of the parts consisting of chassis and body to said computer means for processing thereby.

2. An equalization installation according to claim 1, wherein said acceleration responsive means is a gyroscope means.

3. An equalization installation according to claim 2, wherein said computer means is an analog computer means and said gyroscope means is mounted within said computer means.

4. An equalization installation according to claim 1, wherein said servo-control means includes a hydraulic switch means arranged between spring leg means and pressure tank means of a hydropneumatic spring means, said hydraulic switch means being electrically actuatable by said computer means.

5. An equalization installation according to claim 1, wherein said servo-control means includes servo pressure equalizing means operatively connected to hydropneumatic spring means arranged at the wheels of the vehicle.

6. An equalization installation according to claim 5, wherein said servo pressure equalizing means includes displacement pick-up means responsive to said computer means for controlling the movement of a servopiston of said servo pressure equalizing means.

7. An equalization installation according to claim 1, wherein said detecting means includes transmitter means connected with the spring leg means.

8. An equalization installation according to claim 1, wherein said computer means is a central electronic computer means provided for all control operations.

9. An equalization installation according to claim 1, further comprising separate electronic control circuit means, each control circuit means having a computer means for relatively more simple control operations dependent essentailly from one component.

10. An equalization installation according to claim 9, wherein said control operations include compensation for starting nose-diving and erection of the body against centrifugal force.

* * * * *